United States Patent
Liu et al.

(10) Patent No.: US 7,720,882 B2
(45) Date of Patent: May 18, 2010

(54) DATA FILE MANAGEMENT AND SEARCH METHOD AND SYSTEM BASED ON FILE ATTRIBUTES

(75) Inventors: Jian-Hong Liu, Kaohsiung County (TW); Yi-Chang Zhuang, Kaohsiung (TW); Lian-Jou Tsai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 254 days.

(21) Appl. No.: 11/767,374

(22) Filed: Jun. 22, 2007

(65) Prior Publication Data

US 2008/0215545 A1    Sep. 4, 2008

(30) Foreign Application Priority Data

Mar. 3, 2007    (TW) ............................... 96107360 A

(51) Int. Cl.
*G06F 17/30*    (2006.01)
(52) U.S. Cl. .................. 707/803; 707/706; 707/793
(58) Field of Classification Search ................ 707/1–3, 707/10, 100–102

See application file for complete search history.

(56) References Cited

U.S. PATENT DOCUMENTS

| | | | |
|---|---|---|---|
| 6,208,986 B1 * | 3/2001 | Schneck et al. | 707/3 |
| 7,080,059 B1 | 7/2006 | Poston et al. | |
| 7,254,582 B2 * | 8/2007 | Song et al. | 707/102 |
| 7,266,516 B2 * | 9/2007 | Song et al. | 705/27 |
| 2005/0223024 A1 * | 10/2005 | Hyun et al. | 707/102 |
| 2008/0005150 A1 * | 1/2008 | Gupta et al. | 707/102 |

* cited by examiner

*Primary Examiner*—Debbie Le
(74) *Attorney, Agent, or Firm*—Quintero Law Office

(57) ABSTRACT

A data file management and search method based on file attributes is disclosed. At least one data file, externally imported or generated by a user, is retrieved. Attributes of the data file are edited, a virtual catalog corresponding to the data file is generated, and a catalog tree is built according to the data file and the virtual catalog. The virtual catalog and the data file are displayed by a user interface. A search operation is performed based on a search command to locate at least one required virtual catalog or data file among multiple data files and virtual catalogs. A basic operation is implemented on the located virtual catalog or data file.

23 Claims, 23 Drawing Sheets

Virtual Folder Table 500

| name | id | parent | filter |
|---|---|---|---|
| tainan | 1 | 0 | 2006 AND tainan |
| taipei | 2 | 0 | 2006 AND taipei |
|  |  |  |  |

FIG. 13

File Table 510

| name | attribute ids | metadata |
|---|---|---|
| dsc2.jpg | 3, 6, 7 | name ..... |
| dsc3.jpg | 1, 5 | name ..... |
|  |  |  |

FIG. 14

Attributes Table 520

| name | id |
|------|----|
| 2006 | 1 |
| tainan | 2 |
| taipei | 2 |
| | |

FIG. 15

Metadata 530

| name | location | size | atime | mtime | access right |
|------|----------|------|-------|-------|--------------|
| dsc1.jpg | IP, hd1 | 45672 | 06/02/12 | 06/02/12 | rw----- |
| m1.mp3 | IP, hd2 | 32342 | 06/02/12 | 06/02/12 | rw----- |
| v1.avi | IP, hd4 | 2341246 | 06/02/12 | 06/02/12 | -----rw |
| | | | | | |

FIG. 16

DATA FILE MANAGEMENT AND SEARCH METHOD AND SYSTEM BASED ON FILE ATTRIBUTES

BACKGROUND OF THE INVENTION

1. Field of the Invention

The invention relates to a data management method, and more particularly to a data file management and search method and system based on file attributes.

2. Description of the Related Art

Data stored in a computer system is sorted and introduced in different catalogs for classification, management, and search. Data can be accurately classified into different catalogs but a data search may be difficult due to a great amount of returned data, resulting the inability to locate accurate data. Currently, a data search method obtains desired data according to keywords. Such a manner cannot completely filter data rapidly and accurately An operating system (Microsoft Windows XP, for example) manages data by catalogs and creates a catalog tree for user browsing based on catalog layer relations. The catalog tree, however, is a path concept, implying users must memorize a complete path to a desired data item.

A search engine on the Internet locates desired data according to keywords. Thus, users only have to input keywords relating to desired data without being required to memorize data paths. The data search, however, generates multiple data items such that the desired data cannot be rapidly obtained.

Additionally, multimedia data management applications manage a single type of data, such as pictures, video files, or music, retrieving essential information from the data as attributes thereof. Some multimedia data applications further provide the addition of specified attributes in a data file. Thus, desired data can be located according to the added attributes or determines whether located data files comprise the same attributes according to input keywords.

U.S. Pat. No. 7,080,059 patent discloses a search and presentation engine, implementing further sorting on located results. The engine generally searches and presents multiple individual data paths, users must then filter the located data paths. Data searching is more convenient if automatic classification for the located data paths is provided.

Thus, the invention provides a data file management and search method and system based on file attributes, integrating searching and catalog browsing and achieving preferable flexibility and ease of use by data attribute assignment and virtual catalog creation, to ease location of desired data among a great amount data.

BRIEF SUMMARY OF THE INVENTION

The invention provides data file management and search systems based on file attributes. An exemplary embodiment of a data file management and search system based on file attributes comprises a user interface, an attribute and relational database, a content database, an attribute management module, a search engine, and a data management module. The user interface receives a user input and display virtual catalogs and search results. The attribute and relational database stores relations between attributes and a data file or a virtual catalog. The content database stores contents of multiple data files. When obtaining a plurality of data files, the attribute management module retrieves at least one data file and editing attributes of the data file. The data file is externally imported or generated by user operations. The search engine performs a search operation according to a search command to locate at least one virtual catalog or data file among multiple data files and virtual catalogs. The data management module creates a virtual catalog corresponding to the data file obtained by the attribute management module, establishes a catalog tree according to the data file and the corresponding virtual catalog, displays the data file and the corresponding virtual catalog in the user interface according to the catalog tree and a user operation, and implements a basic operation on a data file or virtual catalog located by the search engine.

The invention further provides data file management and search methods based on file attributes. An exemplary embodiment of a data file management and search method based on file attributes comprises the following. At least one data file, externally imported or generated by a user, is retrieved. Attributes of the data file are edited, a virtual catalog corresponding to the data file is generated, and a catalog tree is built according to the data file and the virtual catalog. The virtual catalog and the data file are displayed by a user interface. A search operation is performed based on a search command to locate at least one required virtual catalog or data file among multiple data files and virtual catalogs. A basic operation is implemented on the located virtual catalog or data file.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 13 illustrates a virtual catalog table stored in the content database shown in FIG. 1;

FIG. 14 illustrates a file table stored in the content database shown in FIG. 1;

FIG. 15 illustrates an attribute table stored in the content database shown in FIG. 1;

FIG. 16 illustrates a metadata table stored in the content database shown in FIG. 1;

DETAILED DESCRIPTION OF THE INVENTION

Figure 1:
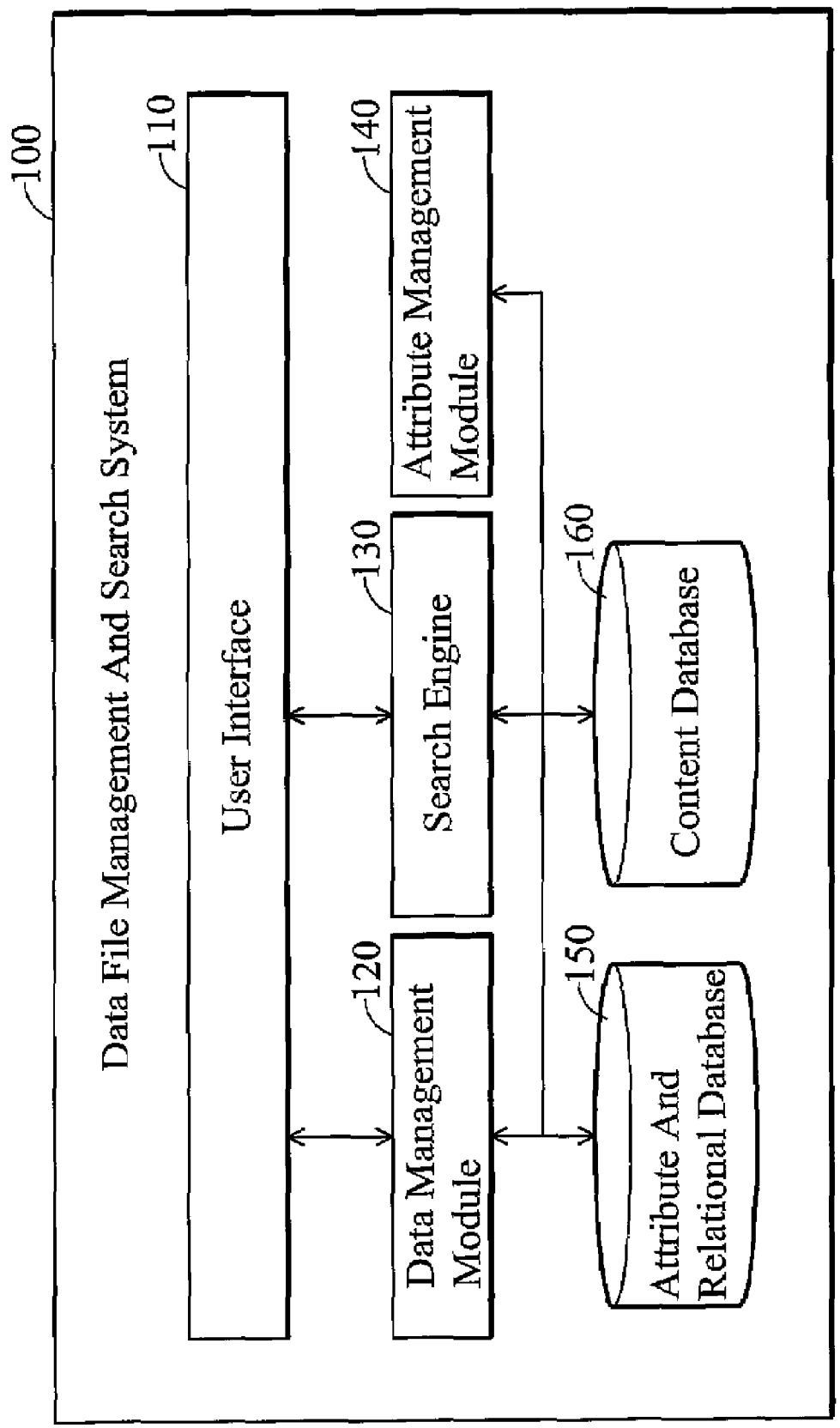
FIG. 1 is a schematic view of an embodiment of a data file management and search system based on file attributes.

Several exemplary embodiments of the invention are described with reference to FIGS. 1 through 12, which generally relate to data file management and search. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a data file management and search method and system based on file attributes.

Embodiments of a data file management and search method and system simplify data file management and use, achieving data classification based on user-defined attributes. Filters are employed to organize data files with the same characteristics in a virtual catalog and a browsing tree is created according to the organized virtual catalogs. Different browsing trees can be created by defining filters of virtual catalogs, to provide flexible browsing. Additionally, data is searched via the browsing trees and search results are stored for further operations and management.

Required components of the data file management and search method and system comprises "attributes" and "virtual catalogs". An attribute is represented as a string, the string describing characteristics of a data file, and multiple attributes can be assigned to a data file. A data file is rapidly located and obtained according to assigned attributes. Data files with the same characteristics can be collected and located in a virtual catalog for data management. A virtual catalog comprises a filter, describing characteristics thereof. Only a data file corresponding to the characteristics can be linked to by the virtual catalog.

The filter content is strings composed of combinations of multiple attributes and logic operation symbols, such as AND, OR, XOR, NOT, and so forth. The filter content of a virtual catalog is "music AND 2006", indicating data files in the virtual catalog must comprise "music" and "2006" attributes. Additionally, a virtual catalog can also comprise other virtual catalogs (sub virtual catalogs). A filter of a virtual catalog and that of a sub virtual catalog thereof may not comprise relations, providing a hierarchical catalog structure to preferably browse data files.

FIG. 1 is a schematic view of an embodiment of a data file management and search system based on file attributes.

Data file management and search system 100 comprises a user interface 110, a data management module 120, a search engine 130, an attribute management module 140, an attribute and relational database 150, and a content database 160.

Data file management and search system 100 reacts to user operations, thus, user interface 110 must monitor and transform user operations to service requests for other components. When a user request is completely performed by data file management and search system 100, the result must be displayed by user interface 110 to complete the user request. User interface 110 can be employed for user operations and attribute settings and trigger data management module 120 to perform operations corresponding to set attributes.

Data management module 120 performs operations on attributes and virtual catalogs, manages relations between attributes and data files, and processes operations for virtual catalogs. Data management module 120 records set attributes and relative records in attribute and relational database 150. Search engine 130 searches attribute and relational database 150 according to user input strings (keywords) and returns search results to user interface 110. Data management module 120 browses virtual catalogs using search engine 130 while processing filters of the virtual catalogs.

Content database 160 stores data file contents. When search engine 130 locates desired data files, corresponding data file contents are retrieved from content database 160. Attribute management module 140 monitors data stored in content database 160, automatically detecting contents of stored data files and setting relative attributes. Attribute management module 140 assists in user settings attributes, disabling or enabling set attributes.

Figure 2:
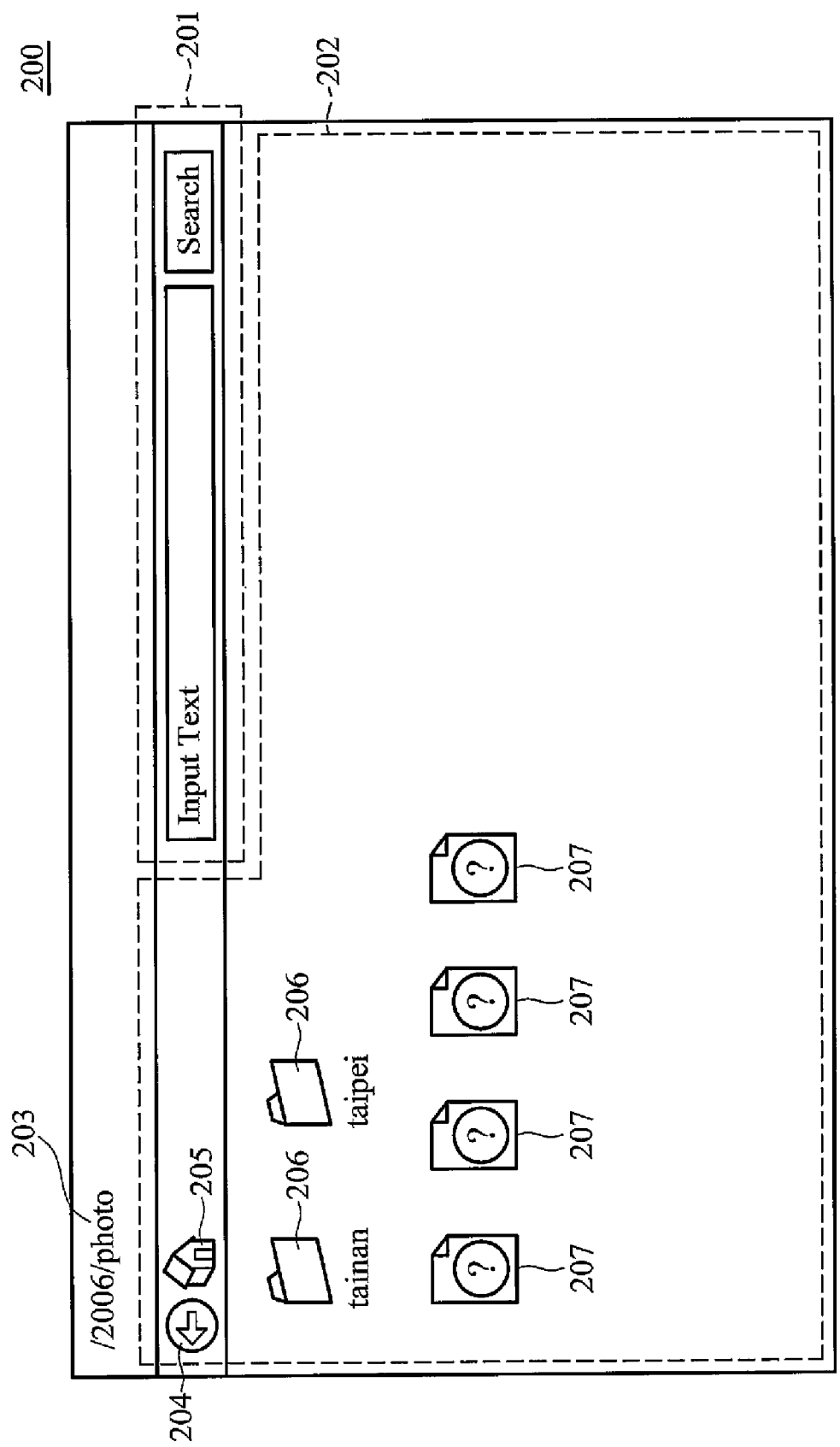
FIG. 2 is a schematic view of an embodiment of a user interface.

FIG. 2 is a schematic view of an embodiment of a user interface.

User interface 200 at least comprises a text input section 201 and a display section 202. Text input section 201 is employed to input search strings. Display section 202 is employed to display search results, graphically displaying virtual catalogs 206 or data files 207. User interface 200 further comprises an icon 204 for returning to the parent virtual catalog and an icon 205 for returning to the initial user defined virtual catalog with. At the top row of user interface 200 shows a string 203, describing a virtual catalog path in which the current browse is located.

Figure 3A:
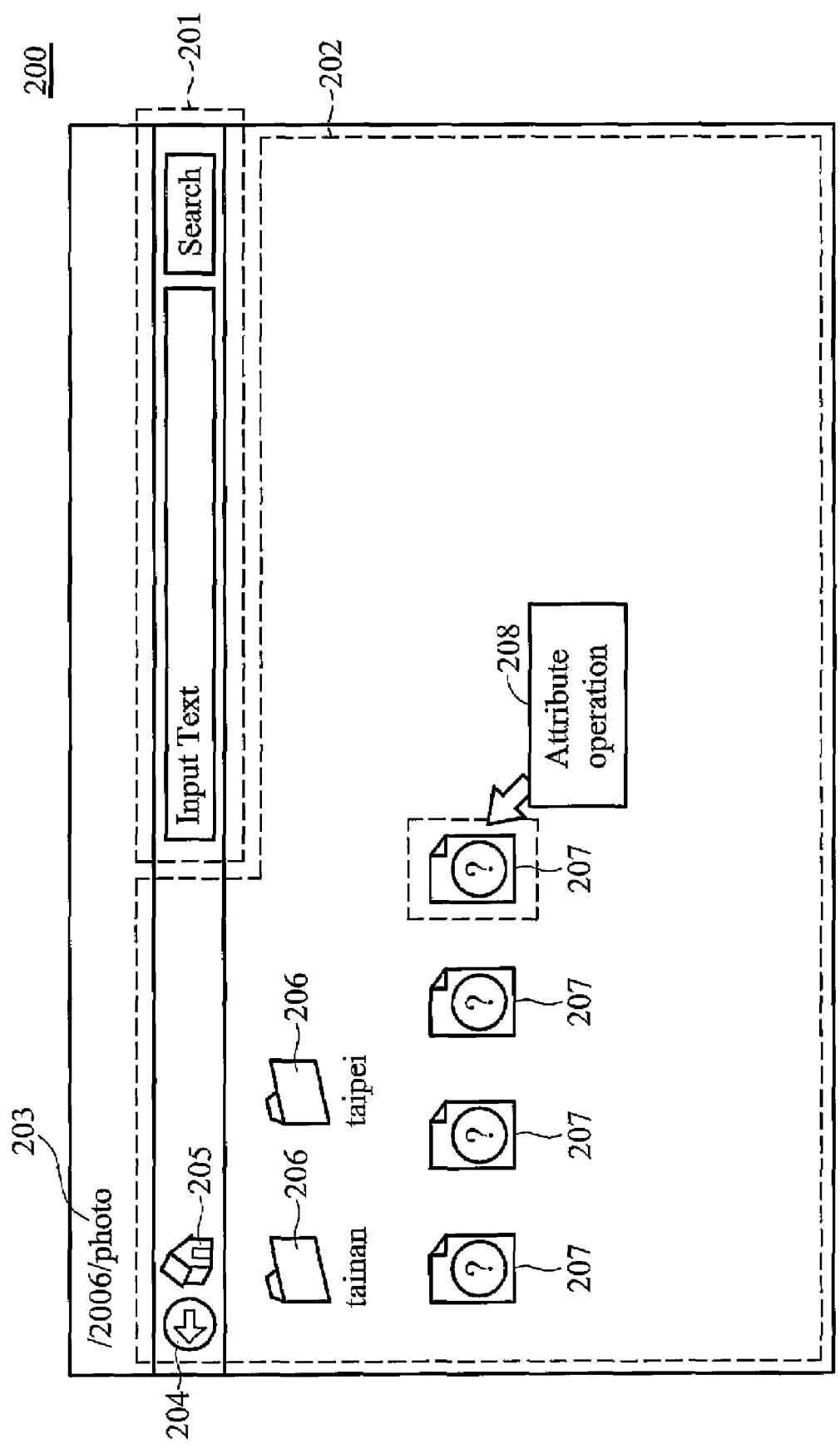
FIG. 3A is a schematic view of an embodiment of an interface showing operations on data file attributes.
Figure 3B:
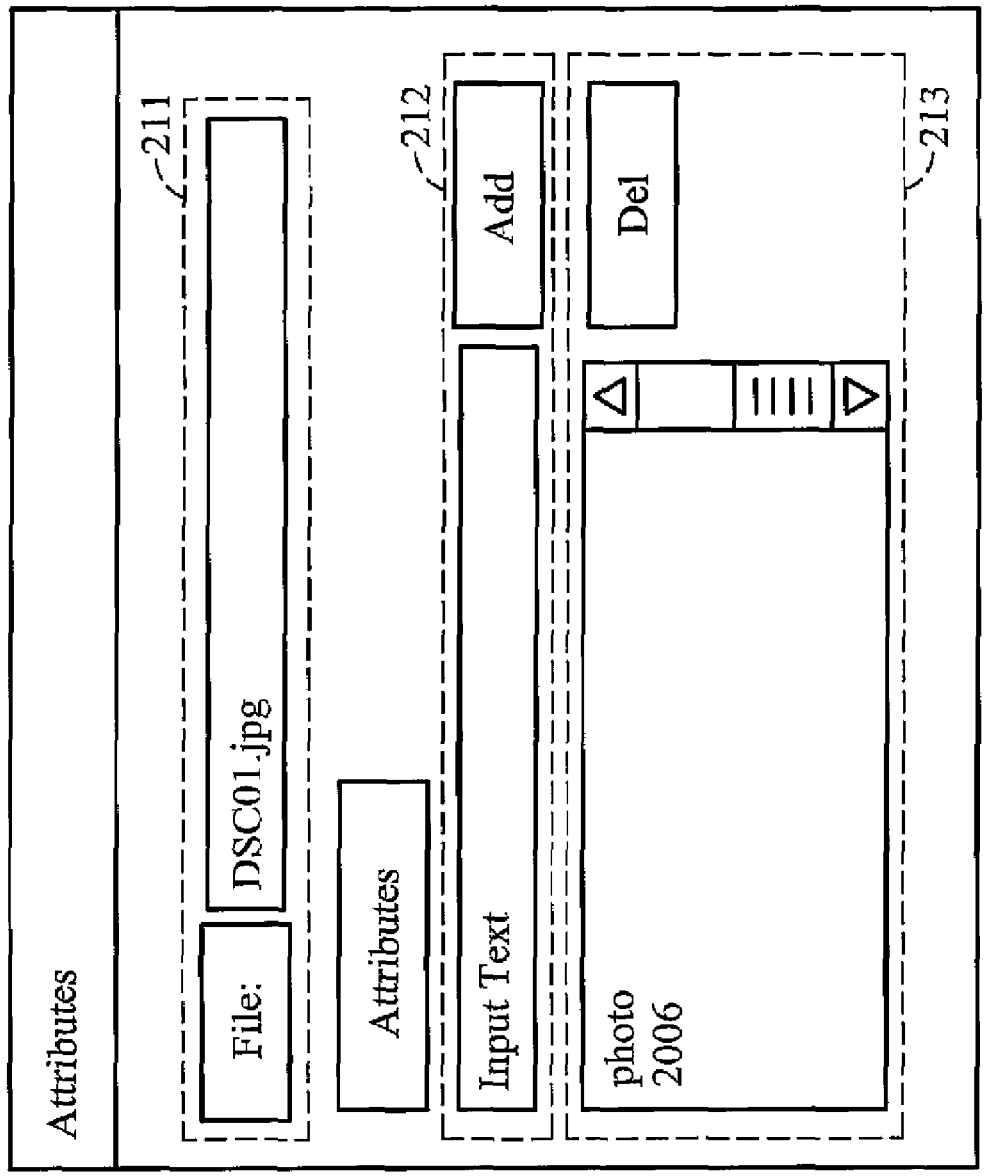
FIG. 3B is a schematic view of an embodiment of an interface showing attribute modification.

FIG. 3A is a schematic view of an embodiment of an interface showing operations on data file attributes. FIG. 3B is a schematic view of an embodiment of an interface showing attribute modification. An attribute modification interface 210 can be triggered via an attribute operation menu 208. Attribute modification interface 210 comprises a file name display section 211, an attribute addition section 212, and an attribute deletion section 213. File name display section 211 displays a currently processed data file name or changes data file names. Attribute addition section 212 adds an attribute to a data file that an attribute is input to the text input section and the "Add" button is pressed to add the attribute to the data file. Attribute deletion section 213 is employed to delete attributes of a data file. The left window of deletion section 213 shows an attribute list, an attribute is selected and the "Del" button is pressed to delete the attribute from the data file.

Figure 4:
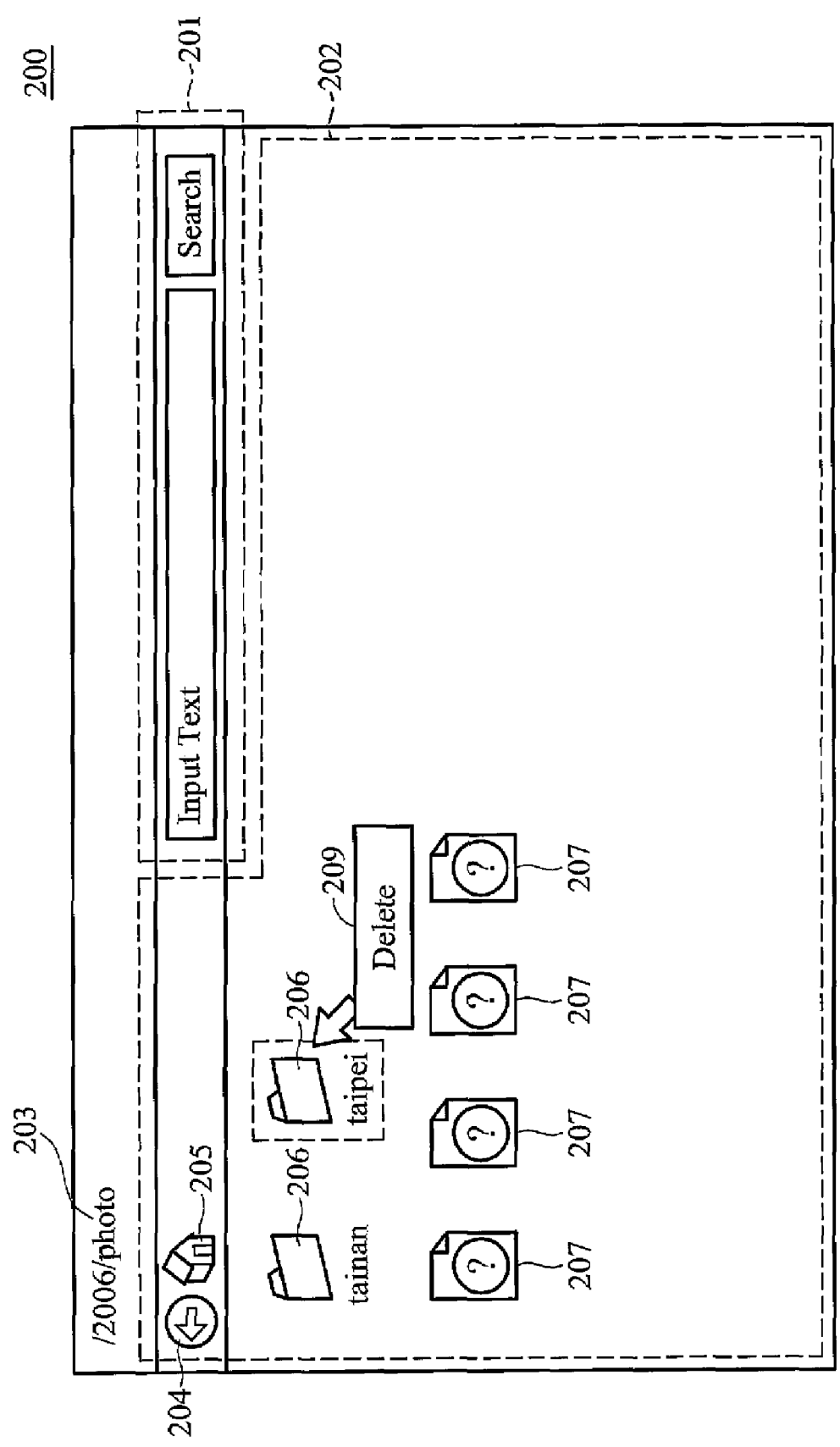
FIGS. 4, 5A, and 5B are schematic views of an embodiment of interfaces showing virtual catalog operations.
Figure 5A:
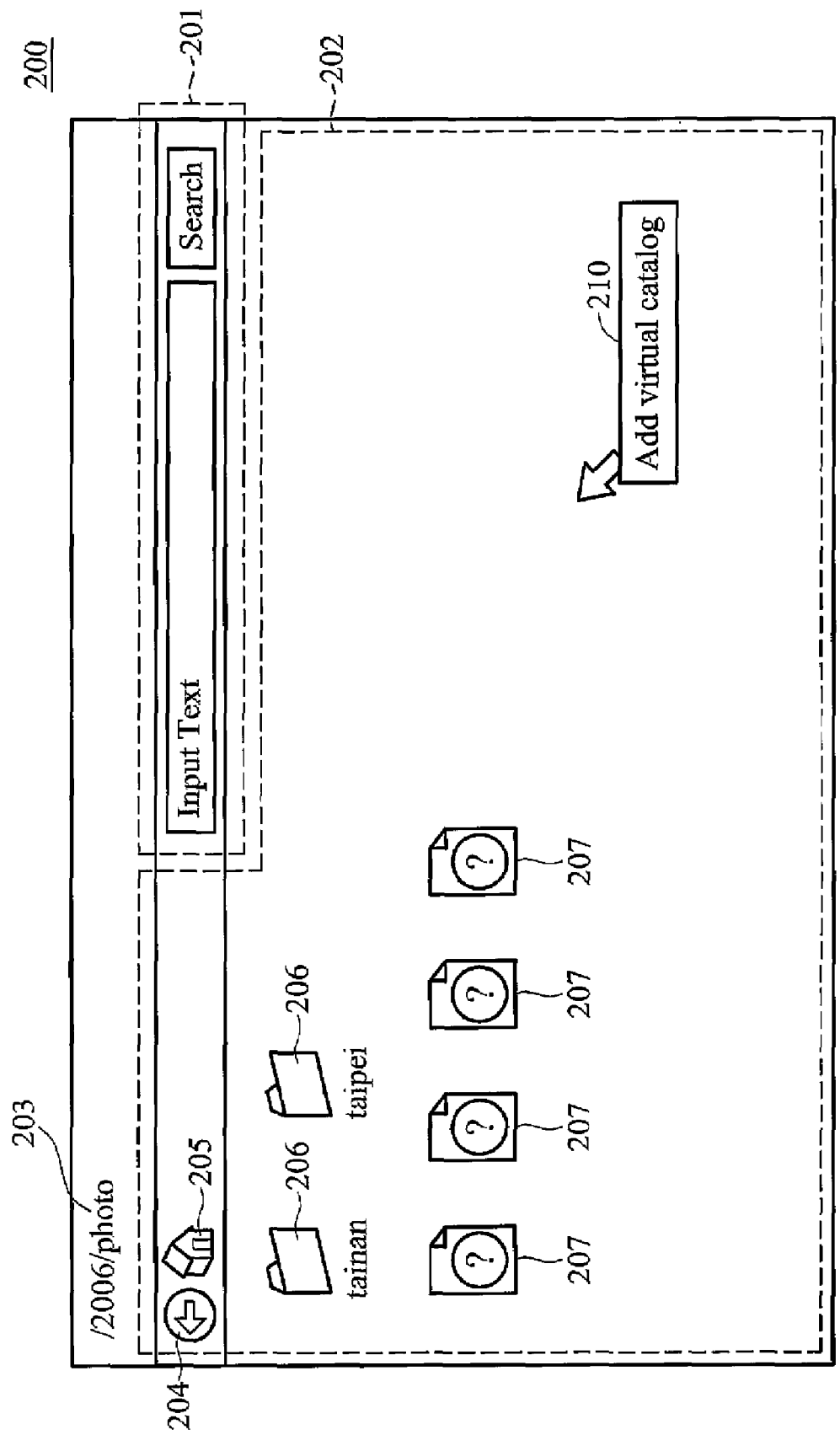
Figure 5B:
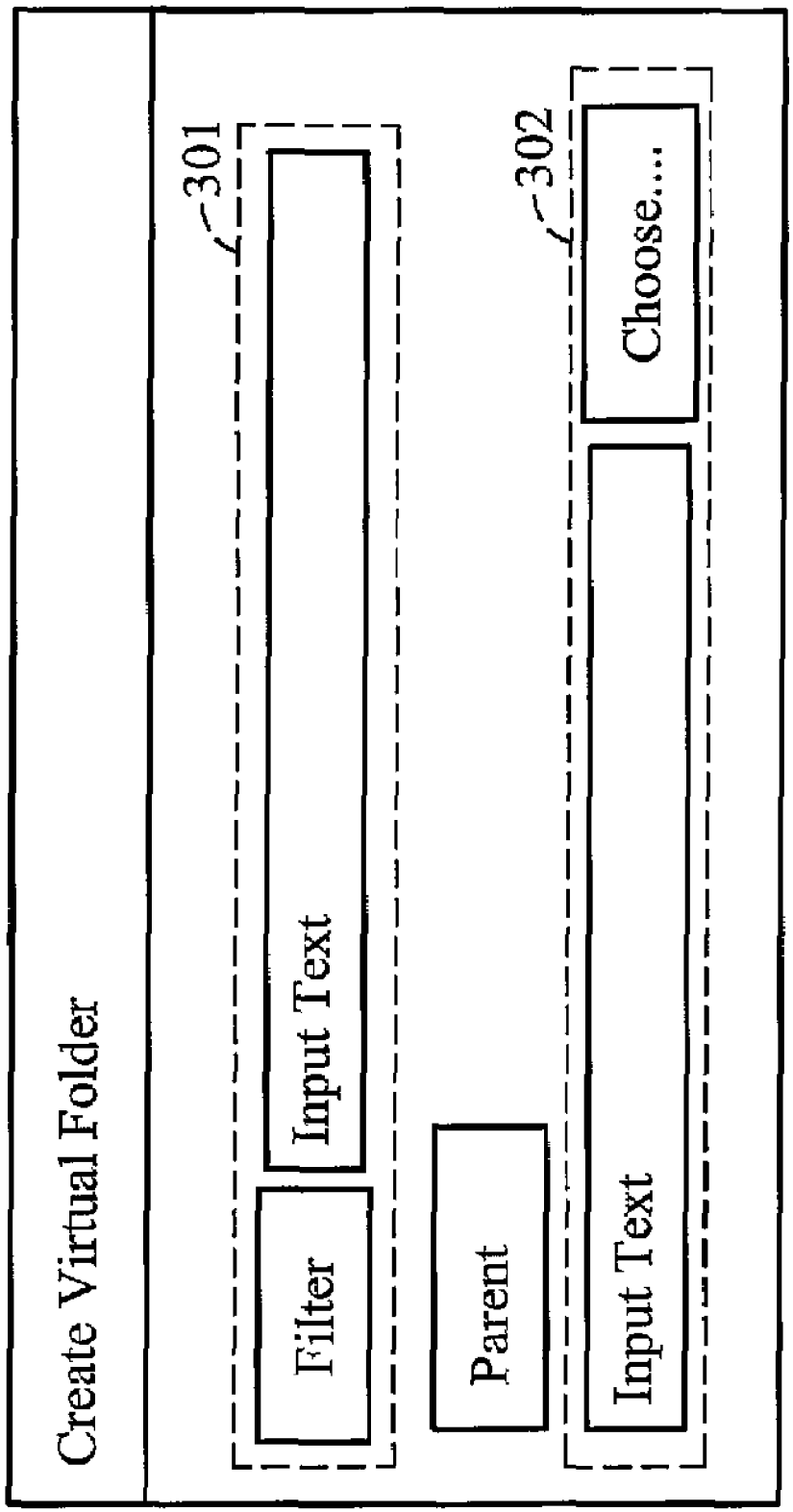

FIGS. 4, 5A, and 5B are schematic views of an embodiment of interfaces showing virtual catalog operations. A designated virtual catalog (as shown by the virtual catalog "Taipei" in FIG. 4) can be deleted via menu 209. Note that deleting a virtual catalog does not delete data files therein but in the virtual catalog and sub virtual catalogs thereof. An adding virtual catalog interface 300 is opened according to an operation menu shown in FIG. 5A. As shown in FIG. 5B, a filter condition input section 301 comprises a text input section for input of filter conditions. As described, the filter content is strings composed of combinations of multiple attributes and logic operation symbols, such as AND, OR, XOR, NOT, and so forth. A parent virtual catalog of the current virtual catalog is selected and reached by pressing the "Choose" button in a parent catalog selection section 302.

Figure 6A:
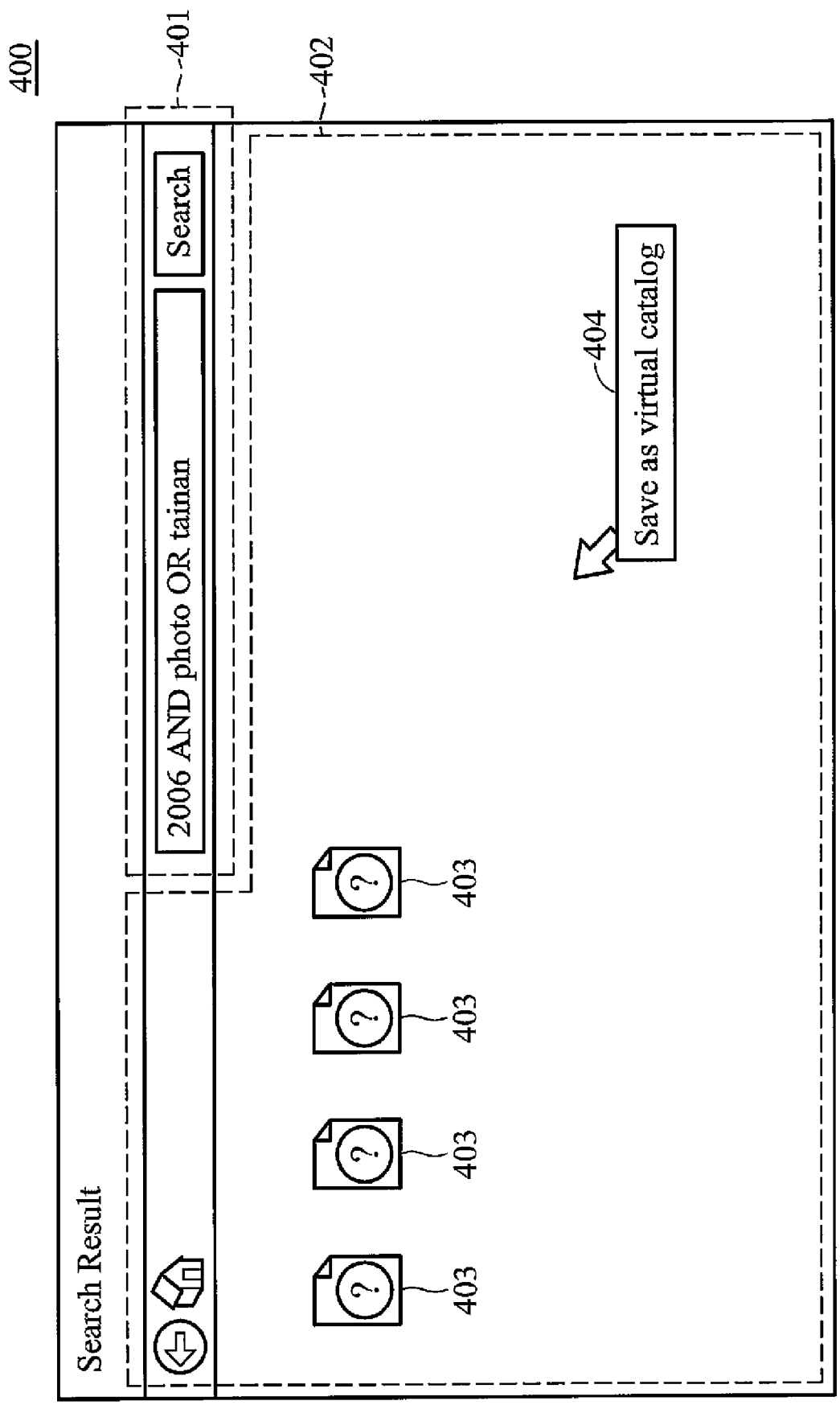
FIG. 6A is a schematic view of an embodiment of an interface showing a data file search.
Figure 6B:
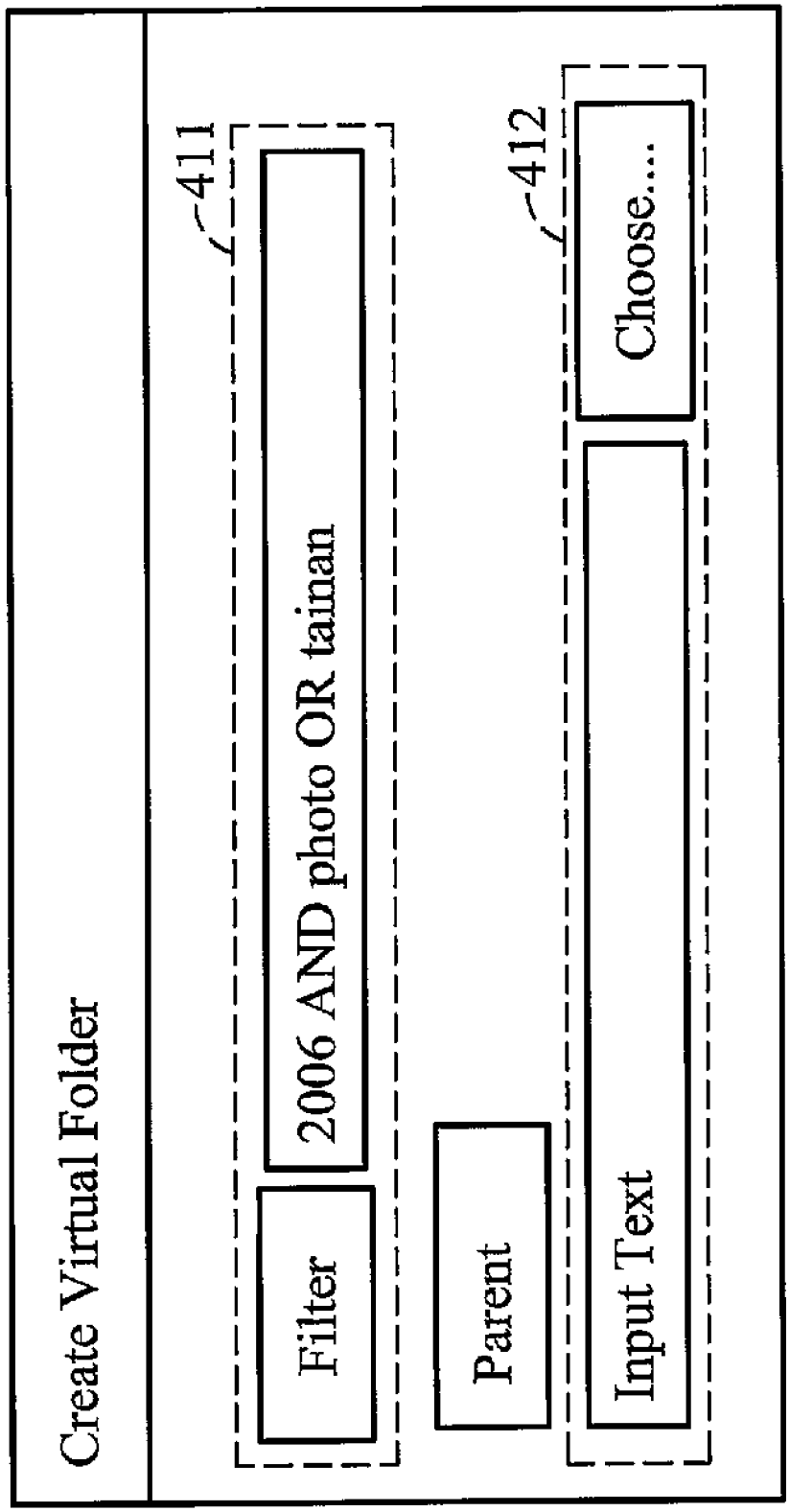
FIG. 6B is a schematic view of an embodiment of an interface showing a data file addition.

FIG. 6A is a schematic view of an embodiment of an interface showing a data file search. FIG. 6B is a schematic view of an embodiment of an interface showing a data file addition. A search string for an attribute is input to an attribute input section 401 of a search result interface 400 while search result 403 is displayed in display section 402. A search result does not comprise any virtual catalog because attributes cannot be assigned thereto. The search result can be stored as a virtual catalog via a save-as menu 404, as shown in an adding virtual catalog interface 410 in FIG. 6B. Compared with adding virtual catalog interface 300 shown in FIG. 5B, a filter condition input to filter condition input section 411 of adding virtual catalog interface 410 shown in FIG. 6B is directly set as a search condition input to text input section 401

FIGS. 13-16 illustrate tables stored in content database 160. FIG. 13 1 illustrates a virtual catalog table 500, recording currently existing virtual catalogs and relational information. Field 501 records a virtual catalog name, field 502 records an identification code of a virtual catalog, field 503 records a parent catalog thereof, and field 504 records a filter thereof. FIG. 14 illustrates a file table 510, recording information relating to a data file. Field 511 records a data file name, field 512 records attribute identification codes of a data file, and field 513 records metadata relating thereto.

FIG. 15 illustrates an attribute table 520. Field 521 records an attribute name and field 522 records an attribute identification code. The attribute identification code in field 522 shown in FIG. 15 is linked to and stored in field 512 shown in FIG. 14. FIG. 16 illustrates a metadata table. Field 531 records a data file name, field 532 records a location at which a data file is located, field 533 records a data file size, fields 534 and 535 record the last accessed time and modified time thereof, and field 536 records the authority thereof.

Figure 7:
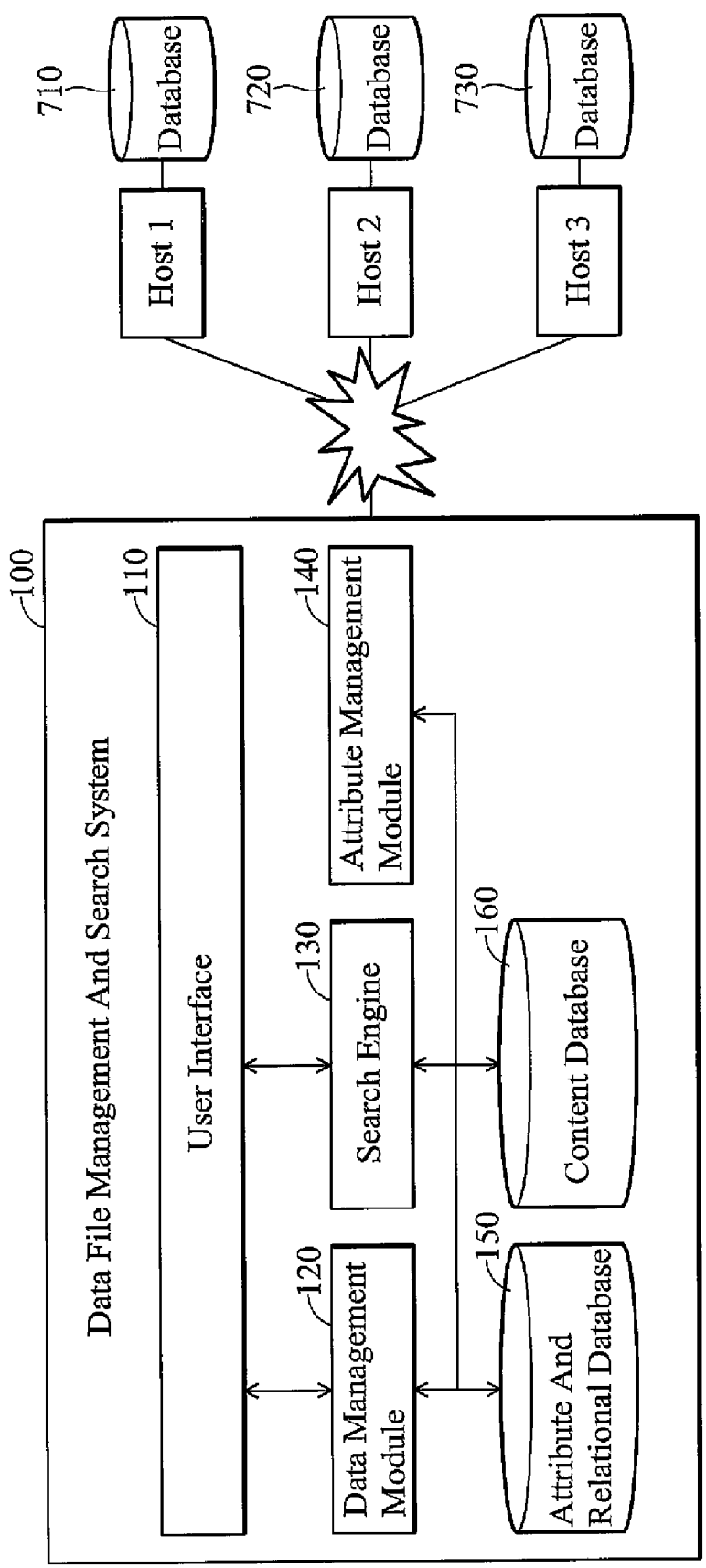
FIG. 7 is a schematic view of another embodiment of a data file management and search system based on file attributes.

FIG. 7 is a schematic view of another embodiment of a data file management and search system based on file attributes.

An embodiment of a data file management and search system is not limited to application in a single host but can associate databases of other hosts via a network. As shown in FIG. 7, data file management and search system 700 can access data file contents stored in databases 710, 720, and 730 of hosts 1, 2, and 3, respectively.

Figure 17:
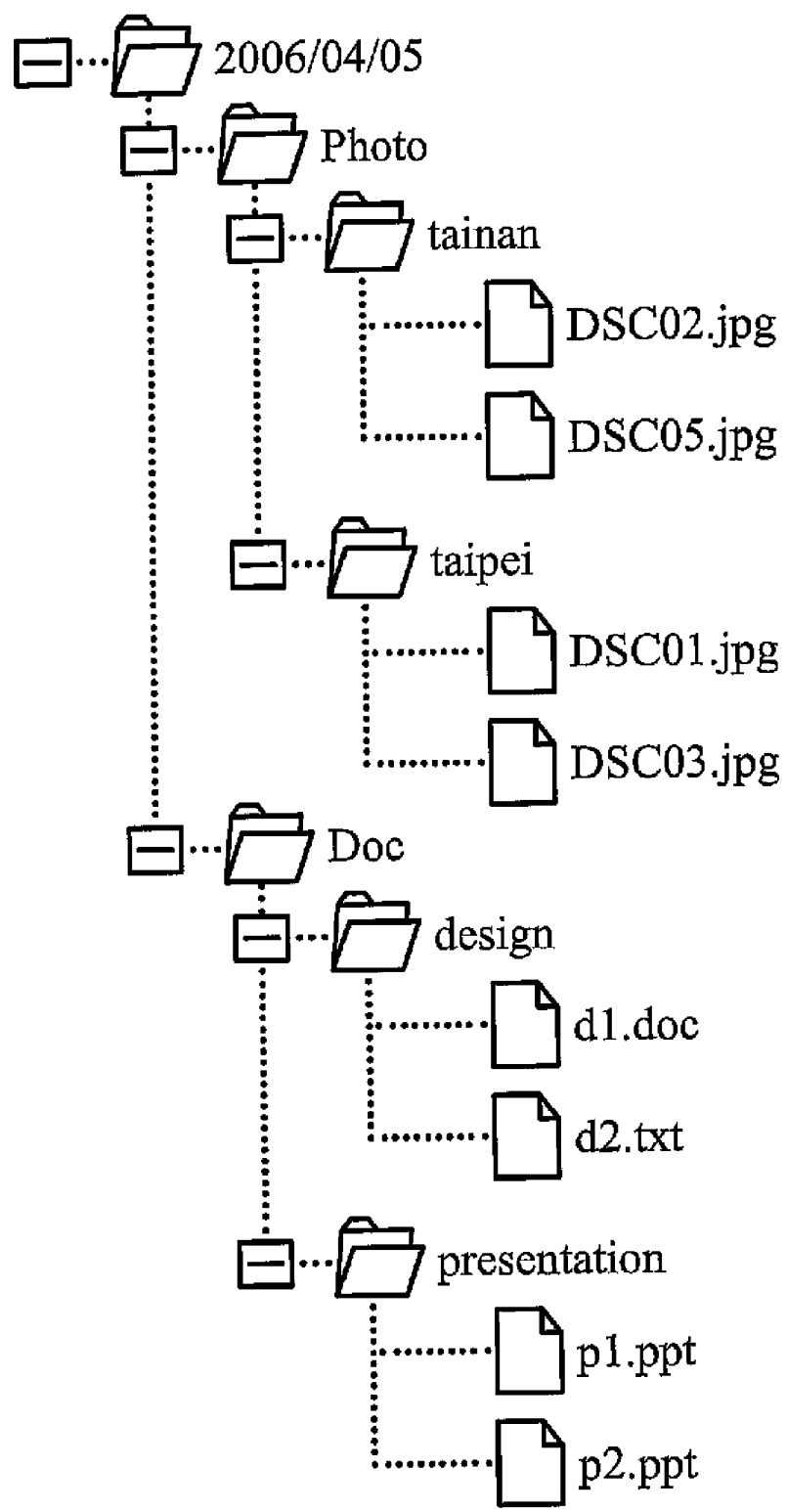
FIG. 17 illustrates a hierarchy of data files.
Figure 18:
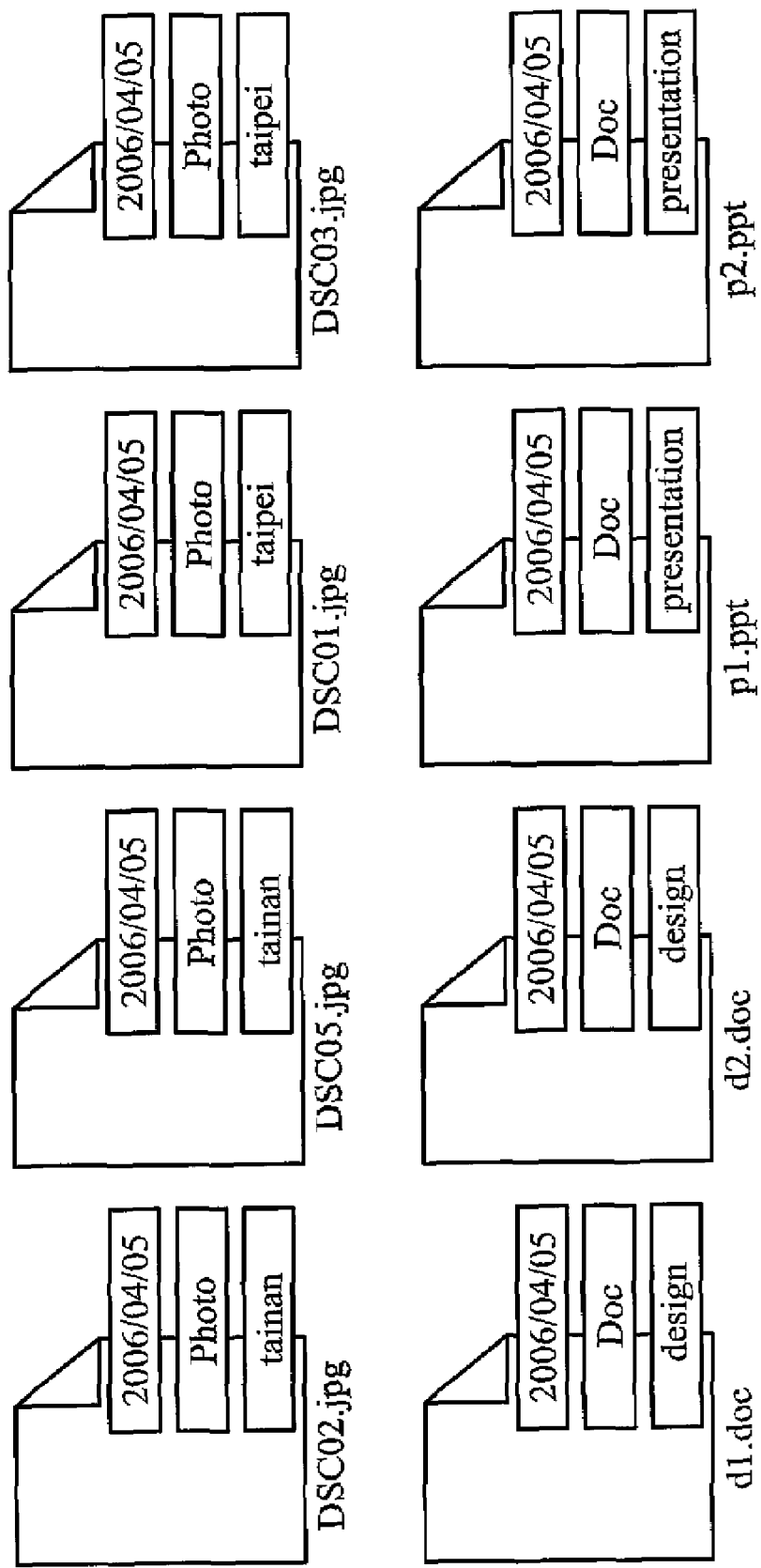
FIG. 18 illustrates attributes attached to data files in FIG. 17.
Figure 19:
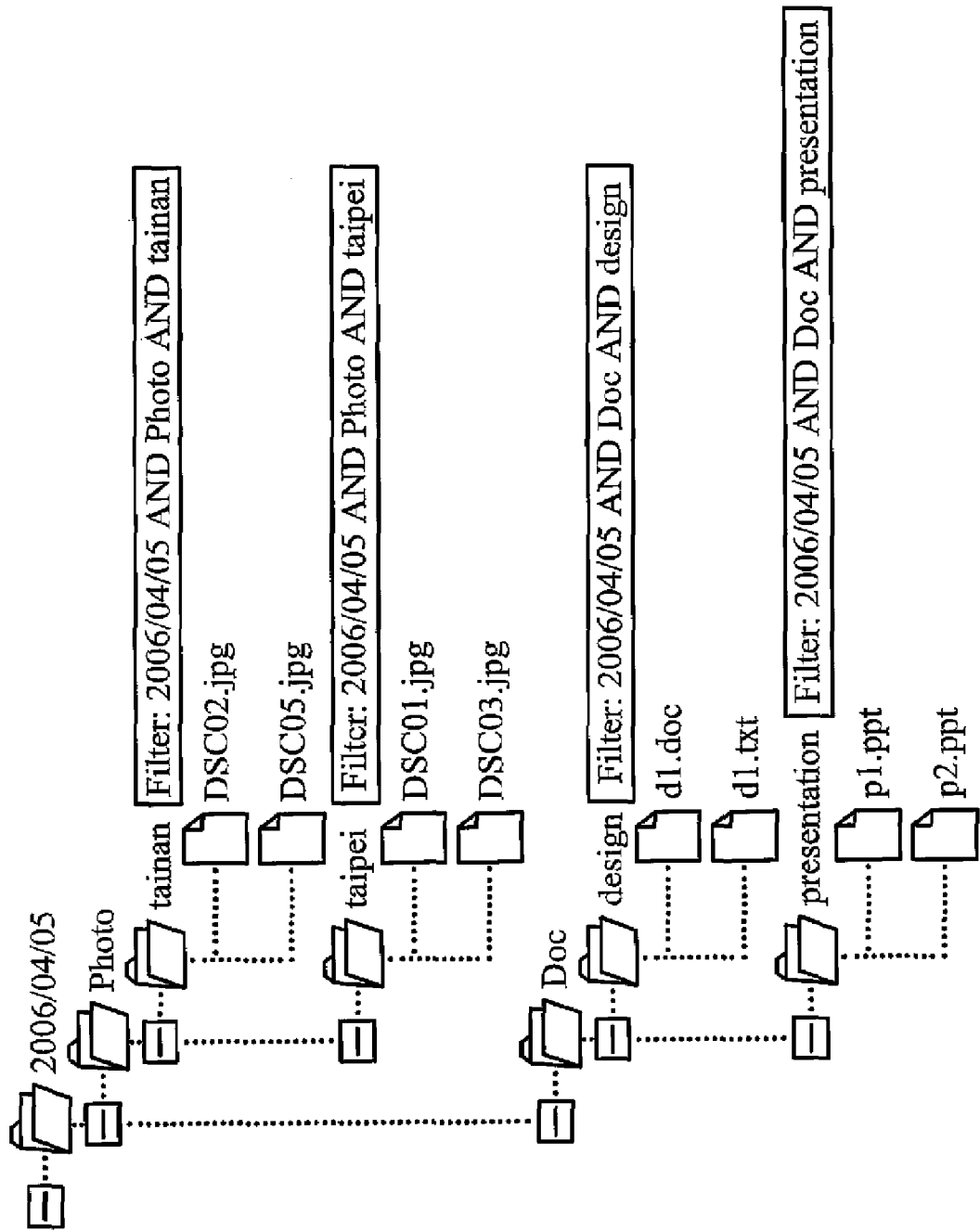
FIGS. 19-22 illustrate hierarchies and attributes of data files.

An embodiment of a data file management and search system also provides importing external data files and defines preset attributes and virtual catalogs for each data file while imported. FIG. 17 illustrates a hierarchy of data files. When a catalog "May 4, 2006" is imported, attributes corresponding to each data file are set according to where the catalog is located. In this case, as shown in FIG. 18, three attributes are assigned to each data file, comprising "May 4, 2006", "photo", or "Doc" and "tainan", "design", or "presentation". Additionally, two virtual catalogs are created and filters and hierarchical relations thereof are set, making the defined catalog hierarchies equivalent to the original file hierarchies, as shown in FIG. 19.

Figure 8:
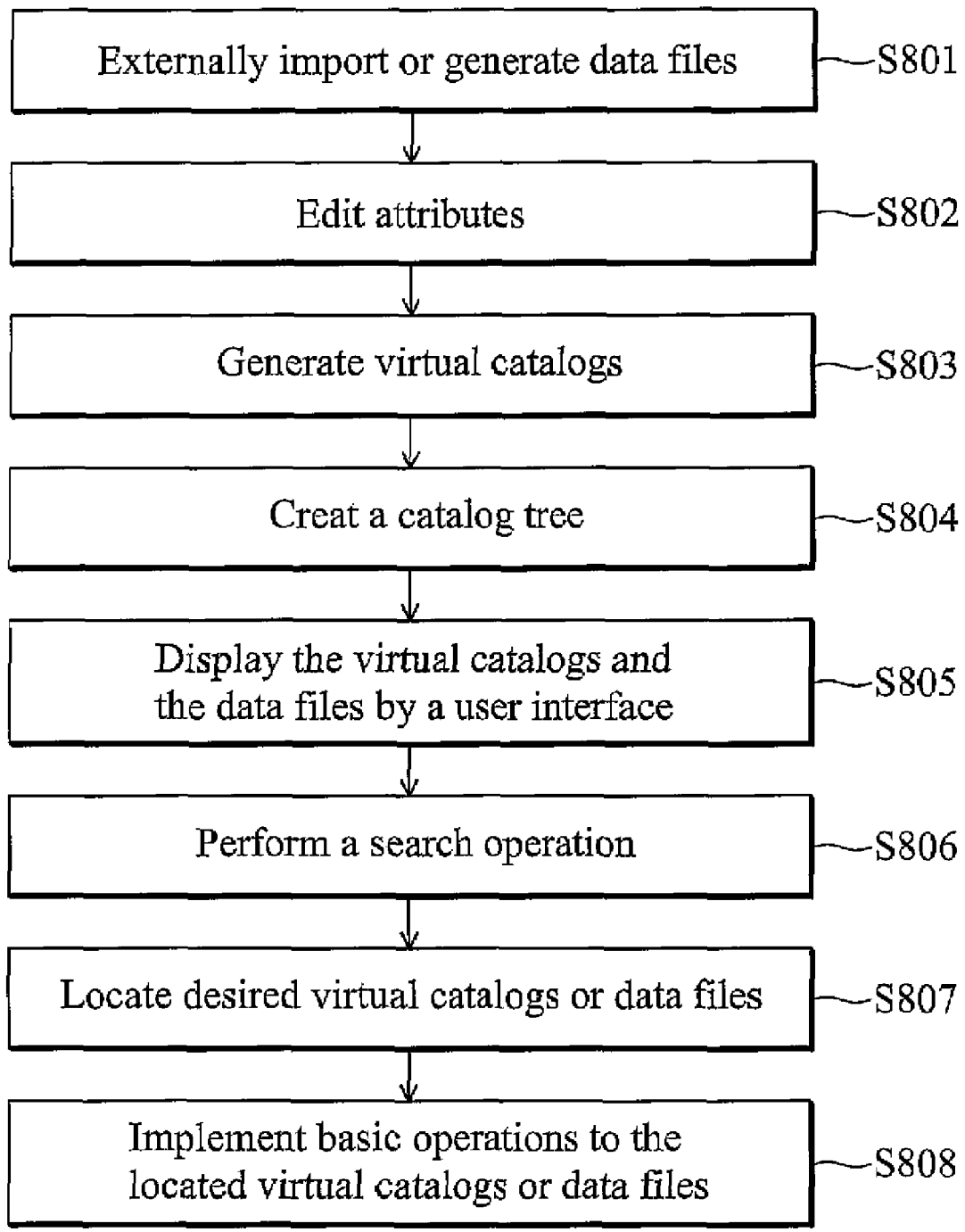
FIG. 8 is a flowchart of an embodiment of a data file management and search method based on file attributes.

FIG. 8 is a flowchart of an embodiment of a data file management and search method based on file attributes.

Data files are externally imported or generated by a user (step S801) and attributes thereof are edited (step S802) and virtual catalogs corresponding thereto are generated (step S803). A catalog tree is created according to the data files and the virtual catalogs (step S804). Next, the virtual catalogs and the data files therein are displayed by a user interface according to the catalog tree and a user operation (step S805). A search operation is performed according to a search command (step S806) to locate desired virtual catalog or data files (step S807). Basic operations, comprising editing, deleting, modifying, and so forth, are implemented to the located virtual catalogs or data files (step S808).

Basic operations comprise reading, writing, deleting, creating, and copying data files. Note that, compared with data copying, data moving moves a data file from a source virtual catalog to a virtual destination catalog, removes filter contents (attributes and logic operation symbols) of the source virtual catalog from the data file, and assigns filter contents (attributes and logic operation symbols) of the virtual destination catalog to the data file.

Figure 9:
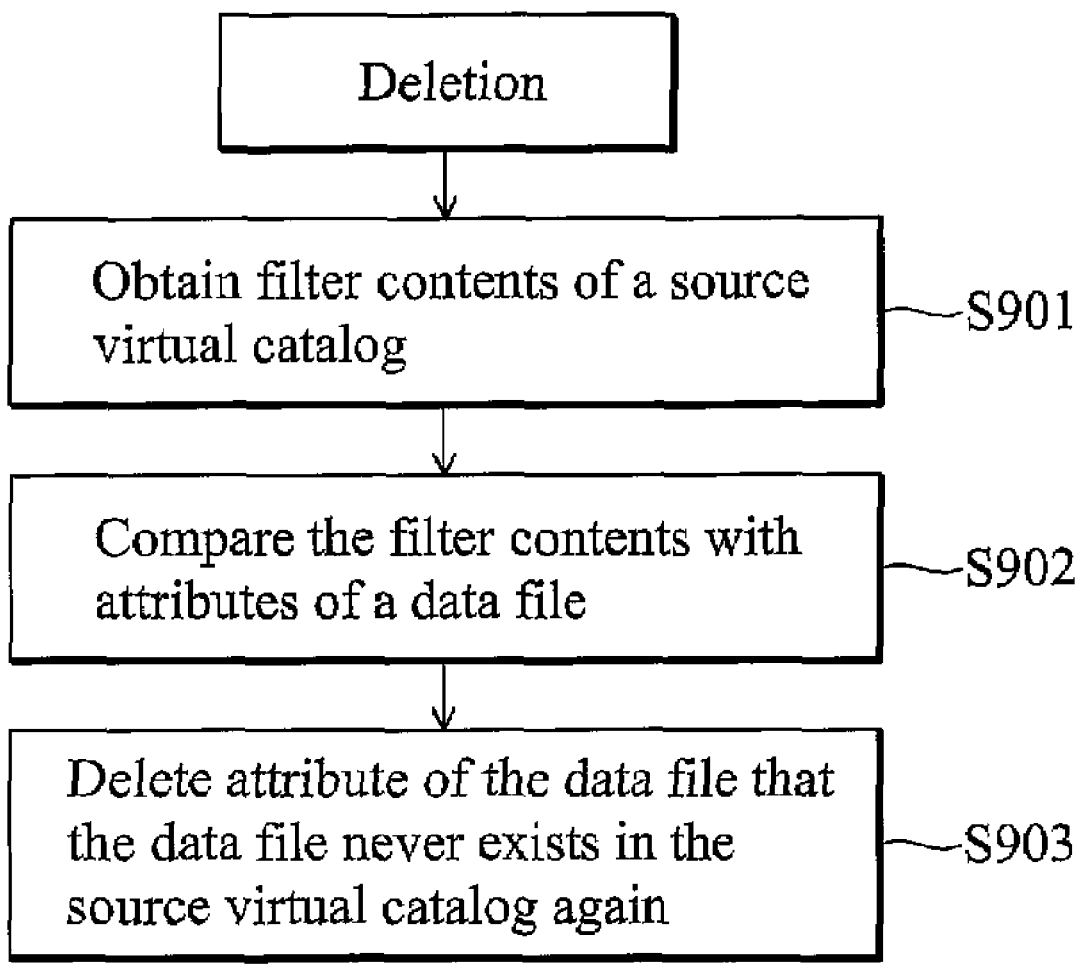
FIG. 9 is a flowchart of an embodiment of a method of deleting data files.

FIG. 9 is a flowchart of an embodiment of a method of deleting data files. Deleting data from a virtual catalog eliminates a data file, thus, attributes of the data file must be removed or adjusted, such that the data file cannot pass filter comparison of the virtual catalog. Filter contents (attributes and logic operation symbols) of a source virtual catalog are first obtained (step S901) and compared with attributes of a data file (step S902), determining which attribute should be deleted such that the data file will never again exist in the source virtual catalog (step S903).

Figure 20:
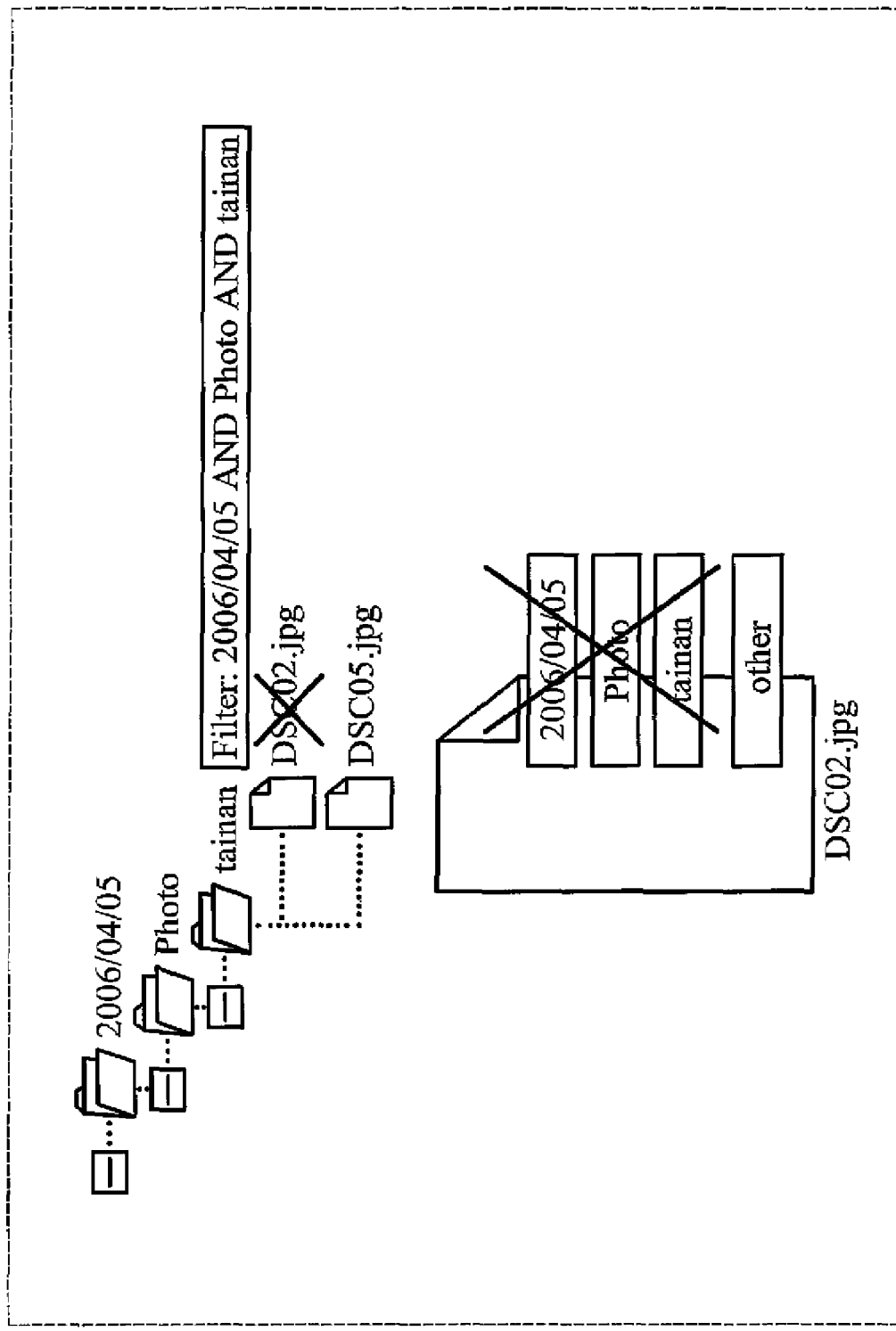

As shown in FIG. 20, "DSC02.jpg" is deleted from the virtual catalog "tainan". Filter contents of the virtual catalog "tainan" comprise "Apr. 4, 2006 AND Photo AND tainan". When compared, "Apr. 4, 2006", "Photo", and "tainan" attributes are deleted. Thus, "DSC02.jpg" will never exist in the virtual catalog "tainan". Additionally, attributes of a data file can also be manually edited and deleted.

Figure 10:
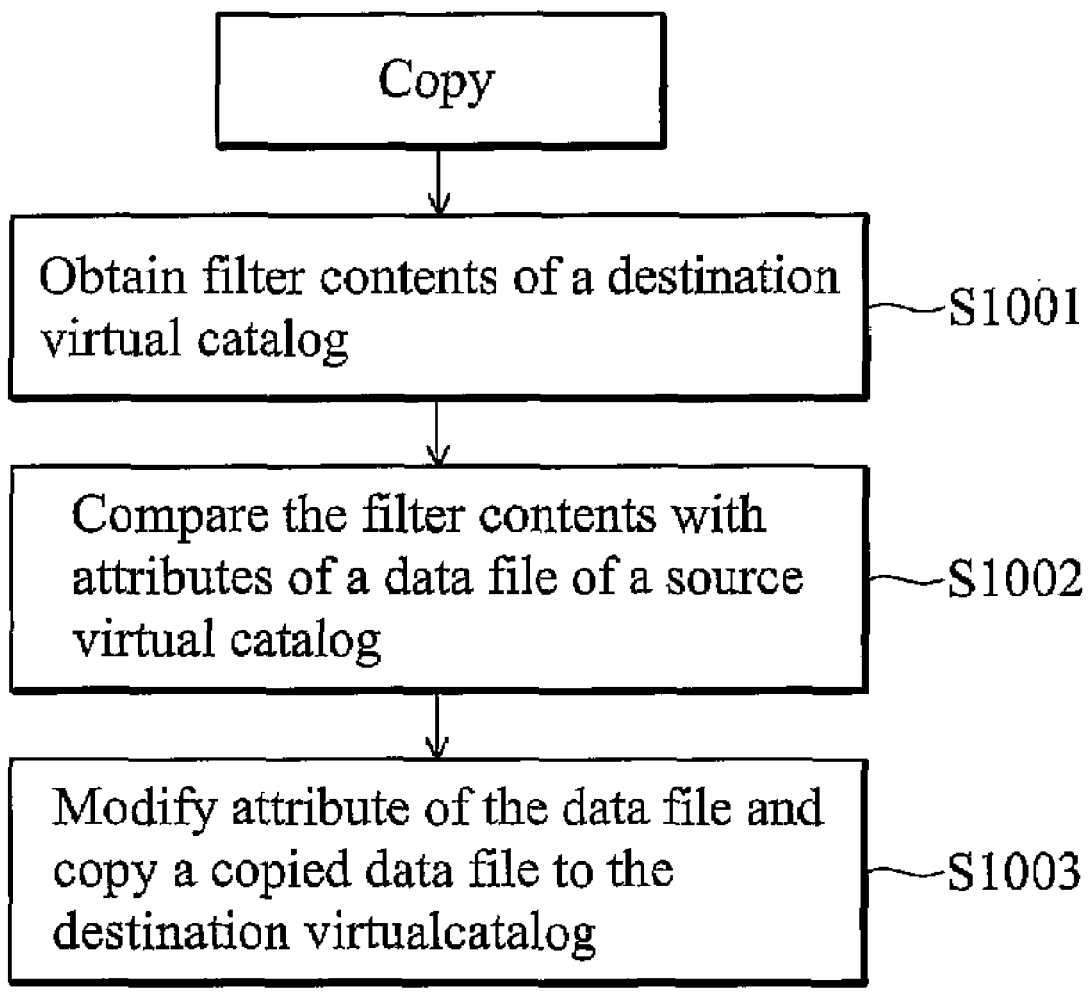
FIG. 10 is a flowchart of an embodiment of a method of copying data files.

FIG. 10 is a flowchart of an embodiment of a method of copying data files.

Data copying allows a data file to exist in different virtual catalogs, thus, attributes of the data file must correspond to filter contents of all the virtual catalogs respectively. Filter contents (attributes and logic operation symbols) of a source virtual catalog are first obtained (step S1001) and compared with attributes of a copied data file (step S1002), determining which attribute should be modified (deleted or added), and the copied data file with modified attributes is moved to a virtual destination catalog (step S1003).

Figure 21:
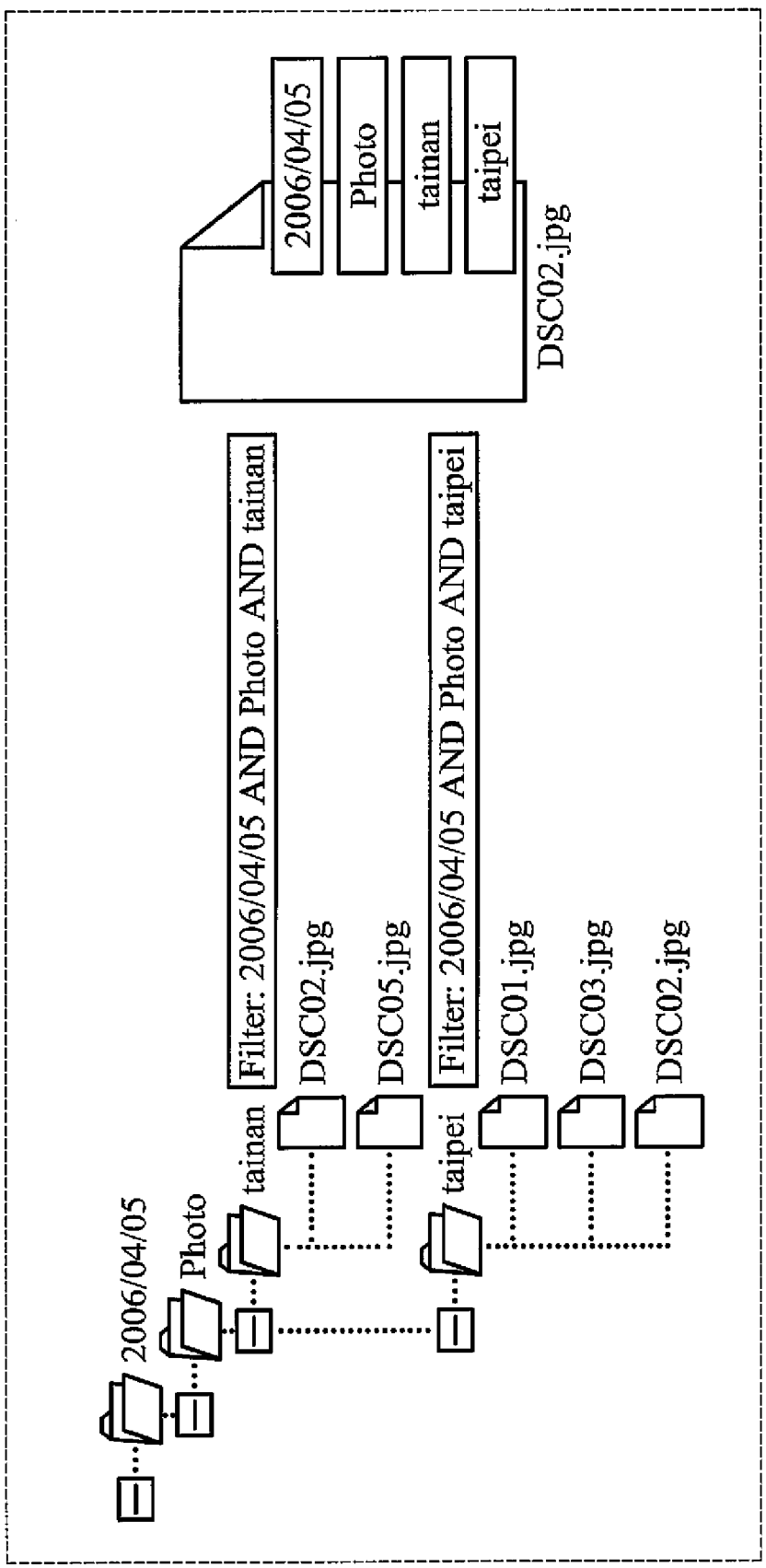

Referring to FIG. 21, "DSC02.jpg" is copied from the virtual catalog "tainan" to the virtual catalog "Taipei". The "tainan" attribute of copied "DSC02.jpg" is first deleted and the "Taipei" attribute is added to "DSC02.jpg", thus copied "DSC02.jpg" is shown in the virtual catalog "Taipei".

Figure 11:
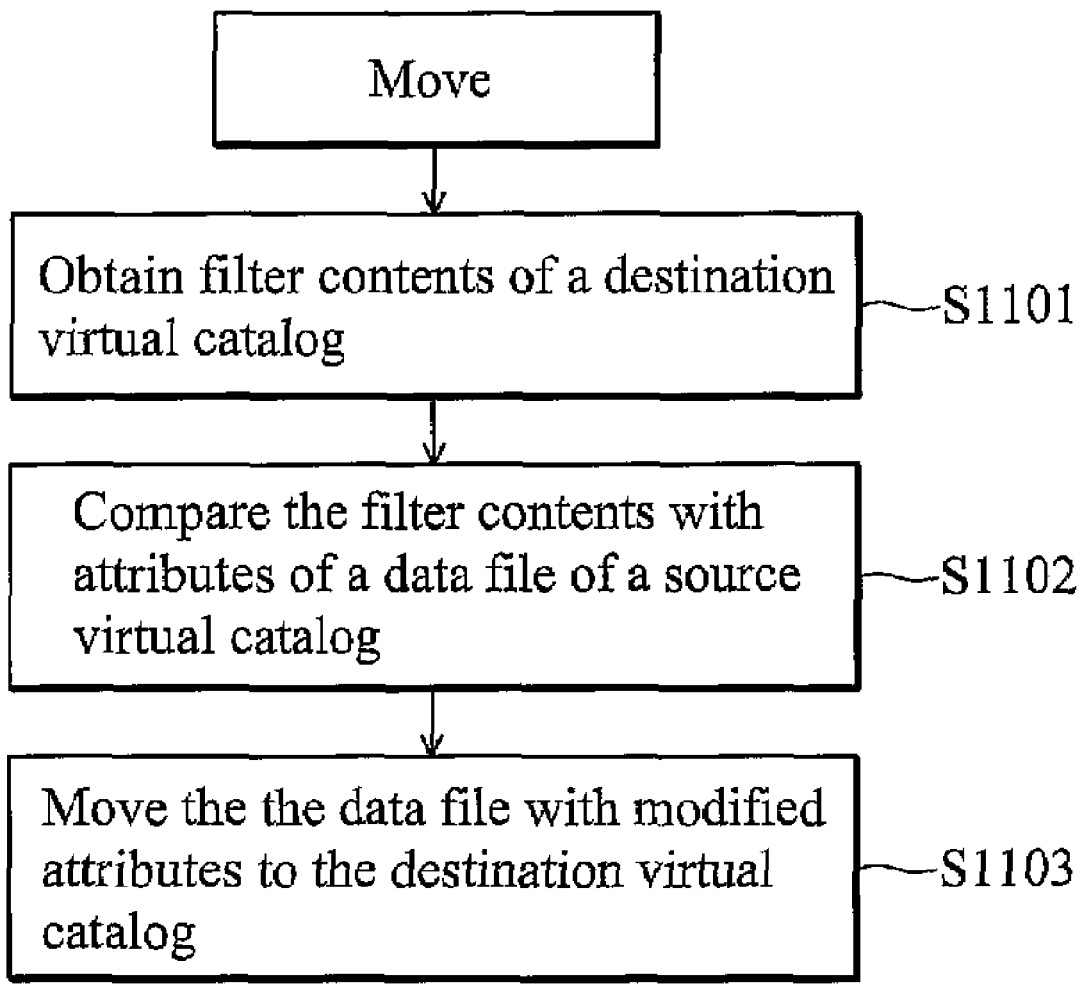
FIG. 11 is a flowchart of an embodiment of a method of moving data files.

FIG. 11 is a flowchart of an embodiment of a method of moving data files.

Filter contents (attributes and logic operation symbols) of a virtual destination catalog is first obtained (step S1101) and compared with attributes of a data file of a source virtual catalog (step S1102), determining which attribute should be modified (deleted or added), and the data file with modified attributes is moved from the source virtual catalog (i.e. deleted from the source virtual catalog) to the virtual destination catalog (step S1103).

Figure 22:
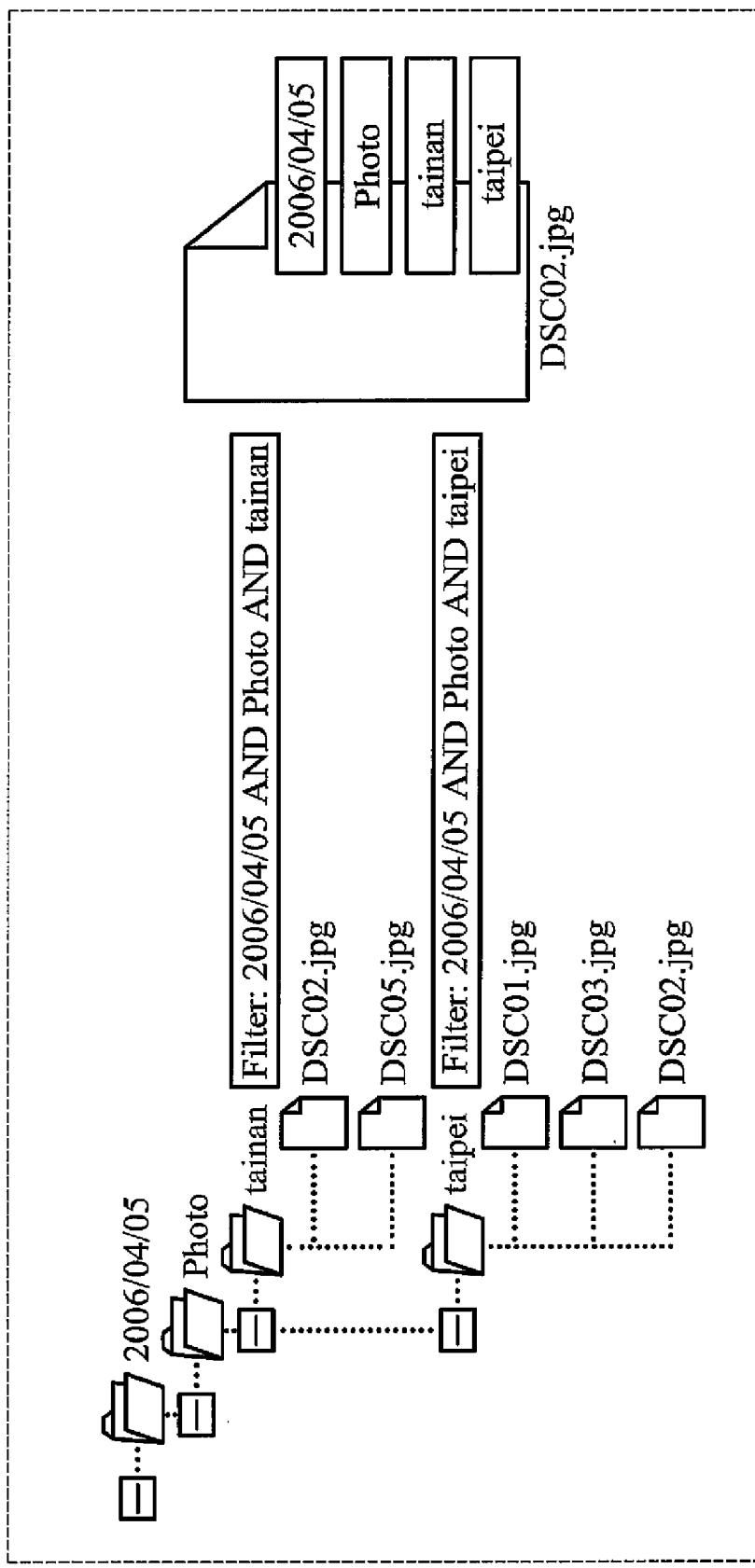

Referring to FIG. 22, "DSC02.jpg" is moved from the virtual catalog "tainan" to the virtual catalog "Taipei". The "tainan" attribute of "DSC02.jpg" is first deleted and the "Taipei" attribute is added to "DSC02.jpg", thus "DSC02.jpg" is shown in the virtual catalog "Taipei".

Figure 12:
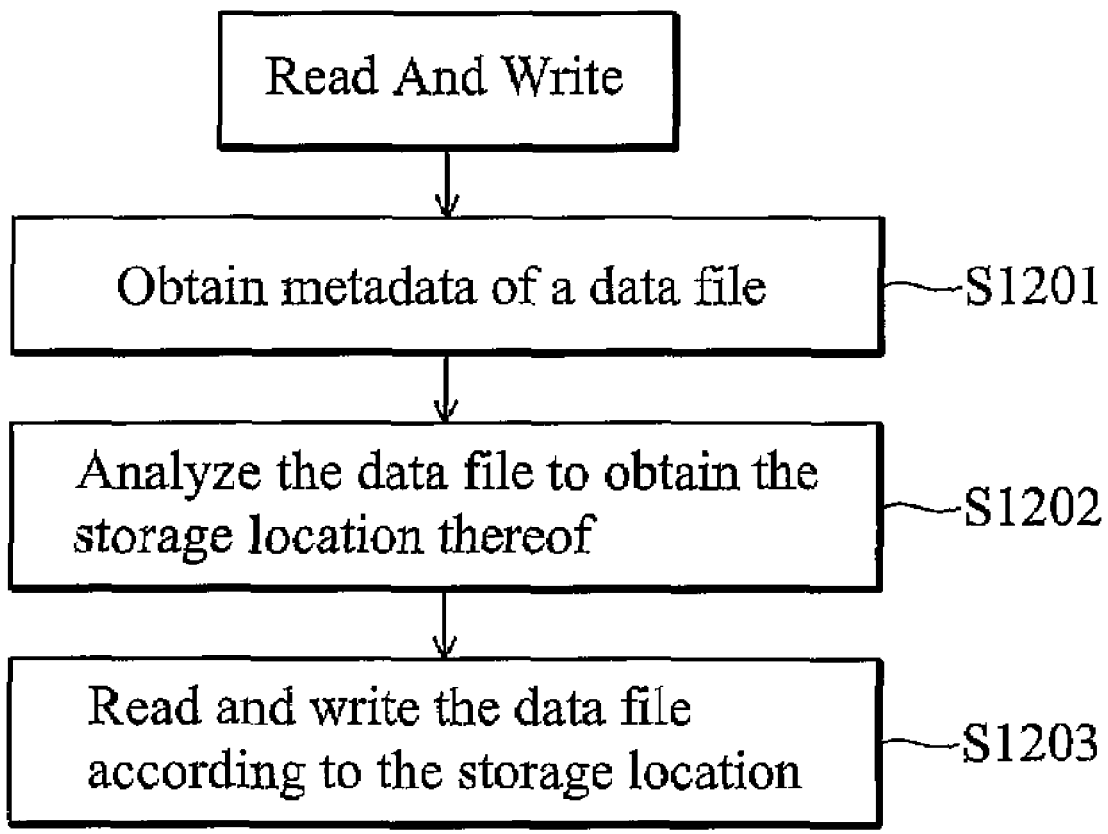
FIG. 12 is a flowchart of an embodiment of a method of reading and writing data files.

FIG. 12 is a flowchart of an embodiment of a method of reading and writing data files.

Metadata of a data file is first obtained (step S1201) and analyzed to obtain the storage location of the data file (step S1202), and reading and writing operations are implemented to the data file according to the storage location (step S1203). It is noted that the data file at the storage location can be read and written via a network, such as the Internet, local area network, or wireless network.

Embodiments of a data file management and search method and system simplify data file management and use, achieving data classification based on user-defined attributes. Filters are employed to organize data files with the same characteristics in a virtual catalog and a browsing tree is created according to organized virtual catalogs. Different browsing trees can be created by defining filters of virtual catalogs, thus flexible browsing is provided. Additionally, data is searched via the browsing trees and search results are stored for further operations and management.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data file management and search system based on file attributes, comprising:
    a user interface, receiving a user input and display virtual catalogs and search results;
    an attribute and relational database, storing relationships between attributes and a data file or a virtual catalog;
    a content database, storing contents of multiple data files;
    an attribute management module, when obtaining a plurality of data files, retrieving at least one data file and editing attributes of the data file, wherein the data file is externally imported or generated by user operations and wherein each attribute is represented as a string, the string describing characteristics of the data file;
    a search engine, performing a search operation according to a search command to locate at least one virtual catalog or data file among multiple data files and virtual catalogs; and
    a data management module, creating a virtual catalog corresponding to the data file obtained by the attribute management module, establishing a catalog tree according to the data file and the corresponding virtual catalog, displaying the data file and the corresponding virtual catalog in the user interface according to the catalog tree and a user operation, and implementing a basic operation to a data file or virtual catalog located by the search engine, wherein the data management module further creates a virtual catalog for a located data file based on the search result.

2. The data file management and search system based on file attributes as claimed in claim 1, wherein the user interface comprises:
    a display interface, displaying the virtual catalogs and the search results; and
    an input interface enabling input of search conditions.

3. The data file management and search system based on file attributes as claimed in claim 1, wherein the data management module creates and deletes attributes of data files or virtual catalogs, creates and deletes virtual catalogs, and browses virtual catalogs.

4. The data file management and search system based on file attributes as claimed in claim 1, wherein the search engine searches the attribute and relational database according to a search condition.

5. The data file management and search system based on file attributes as claimed in claim 1, wherein the attribute and relational database stores relations between attributes and data files or virtual catalogs and metadata of the data files.

6. The data file management and search system based on file attributes as claimed in claim 1, wherein the content database stores contents of data files.

7. The data file management and search system based on file attributes as claimed in claim 1, wherein the data management module adds an attribute and assigns the attribute to a data file, deletes the attribute of the data file, and creates layer relations between the virtual catalogs via the user interface.

8. The data file management and search system based on file attributes as claimed in claim 1, wherein the virtual catalog comprises a filter, filtering all the data files and recording layer relations between the virtual catalogs.

9. The data file management and search system based on file attributes as claimed in claim 8, wherein filter content comprises strings composed of combinations of multiple attributes and logic operation symbols.

10. The data file management and search system based on file attributes as claimed in claim 1, wherein at least one attribute is assigned to a data file.

11. The data file management and search system based on file attributes as claimed in claim 1, wherein the attribute and relational database at least comprises a virtual catalog table, a data file table, and an attribute table.

12. The data file management and search system based on file attributes as claimed in claim 11, wherein the virtual catalog table comprises a virtual catalog name field, a virtual catalog identification field, a parent virtual catalog identification field, and a filter field.

13. The data file management and search system based on file attributes as claimed in claim 11, wherein the data file table comprises a data file name field, an attribute identification field, and a metadata field of a data file.

14. The data file management and search system based on file attributes as claimed in claim 13, wherein multiple attribute identification codes are assigned to a data file.

15. The data file management and search system based on file attributes as claimed in claim 13, wherein the metadata file of the data file comprises a data file name, a store position, a data file size, a data file access time, a data file modified time, and a data file access authority.

16. The data file management and search system based on file attributes as claimed in claim 1, wherein the attribute table comprises an attribute name field and an attribute identification field.

17. A data file management and search method based on file attributes applied in a system comprising at least one attribute management module, one search engine and one data management module, comprising:
    retrieving, by the attribute management module, at least one data file, externally imported or generated by a user;
    editing, by the attribute management module, attributes of the data file, wherein each attribute is represented as a string, the string describing characteristics of a data file;

generating, by the data management module, a virtual catalog corresponding to the data file;

building, by the data management module, a catalog tree according to the data file and the virtual catalog;

displaying, by the data management module, the virtual catalog and the data file in a user interface according to the catalog tree and a user operation;

performing, by the search engine, a search operation based on a search command to locate at least one required virtual catalog or data file among multiple data files and virtual catalogs; and implementing, by the data management module, a basic operation on the located virtual catalog or data file, wherein the method further comprises creating a virtual catalog for a located data file based on the search result.

18. The data file management and search method based on file attributes as claimed in claim 1, further comprising creating and deleting attributes of data files or virtual catalogs, creating and deleting virtual catalogs, and browsing virtual catalogs.

19. The data file management and search method based on file attributes as claimed in claim 17, further comprising adding an attribute and assigns the attribute to a data file, deleting the attribute of the data file, and creating layer relations between the virtual catalogs via the user interface.

20. The data file management and search method based on file attributes as claimed in claim 17, wherein the virtual catalog comprises a filter, filtering all the data files and recording layer relations between the virtual catalogs.

21. The data file management and search method based on file attributes as claimed in claim 20, wherein filter content comprises strings composed of combinations of multiple attributes and logic operation symbols.

22. The data file management and search method based on file attributes as claimed in claim 17, wherein at least one attribute is assigned to a data file.

23. The data file management and search method based on file attributes as claimed in claim 17, wherein a data file is comprised in at least one virtual catalog and filter content of the virtual catalog corresponds to attributes of the data file.

* * * * *